United States Patent
Li et al.

(10) Patent No.: US 9,621,802 B2
(45) Date of Patent: Apr. 11, 2017

(54) METHOD AND APPARATUS FOR PRESENTING PANORAMIC PHOTO IN MOBILE TERMINAL, AND MOBILE TERMINAL

(71) Applicant: Huawei Technologies Co., Ltd., Shenzhen (CN)

(72) Inventors: Xiaojuan Li, Beijing (CN); Wenmei Gao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/735,625

(22) Filed: Jun. 10, 2015

(65) Prior Publication Data

US 2015/0363915 A1 Dec. 17, 2015

Related U.S. Application Data

(63) Continuation of application No. PCT/CN2014/079950, filed on Jun. 16, 2014.

(51) Int. Cl.
H04N 5/232 (2006.01)
H04M 1/725 (2006.01)

(52) U.S. Cl.
CPC .... *H04N 5/23238* (2013.01); *H04M 1/72522* (2013.01); *H04M 1/72569* (2013.01)

(58) Field of Classification Search
None
See application file for complete search history.

(56) References Cited

U.S. PATENT DOCUMENTS 5,594,845 A * 1/1997 Florent .................. G06T 15/20
345/427
6,118,595 A * 9/2000 Miller .................... G03B 37/04
348/36
(Continued)

FOREIGN PATENT DOCUMENTS

CN 1589050 A 3/2005
CN 102023790 A 4/2011
(Continued)

OTHER PUBLICATIONS

Partial English Translation and Abstract of Chinese Patent Application No. CN102420898A, May 29, 2015, 5 pages.
(Continued)

*Primary Examiner* — Hilina K Demeter
(74) *Attorney, Agent, or Firm* — Conely Rose, P.C.

(57) ABSTRACT

A method and an apparatus for presenting a panoramic photo in a mobile terminal, and a mobile terminal. A trigger instruction that is used to instruct the mobile terminal to enter an immersive browsing mode is detected, where the immersive browsing mode is a browsing mode in which a panoramic photo moves as the mobile terminal rotates; and if the trigger instruction is detected, a rotation angle of the mobile terminal is detected and determined, and a panoramic photo that is presented in a normal mode in the mobile terminal is moved and presented according to the determined rotation angle. By using the present invention, complexity of panoramic photo browsing can be reduced, which makes it convenient for a user to browse a panoramic photo.

20 Claims, 12 Drawing Sheets

(56) References Cited

U.S. PATENT DOCUMENTS

| | | | |
|---|---|---|---|
| 6,677,981 B1* | 1/2004 | Mancuso | G06T 3/4038 348/36 |
| 6,717,608 B1* | 4/2004 | Mancuso | G06T 3/4038 345/427 |
| 6,885,392 B1* | 4/2005 | Mancuso | G06T 3/4038 348/218.1 |
| 7,733,368 B2* | 6/2010 | Teo | H04N 5/23238 348/219.1 |
| 2005/0237383 A1 | 10/2005 | Soga | |
| 2007/0109398 A1* | 5/2007 | Teo | H04N 5/23238 348/36 |
| 2010/0174421 A1 | 7/2010 | Tsai et al. | |
| 2011/0110605 A1 | 5/2011 | Cheong | |
| 2011/0149015 A1 | 6/2011 | Lin | |
| 2011/0173565 A1* | 7/2011 | Ofek | G06T 5/50 715/790 |
| 2012/0075410 A1 | 3/2012 | Matsumoto et al. | |
| 2012/0293610 A1* | 11/2012 | Doepke | H04N 5/23238 348/36 |
| 2012/0294549 A1* | 11/2012 | Doepke | G06T 3/4038 382/294 |
| 2013/0229529 A1* | 9/2013 | Lablans | H04N 5/23238 348/169 |
| 2014/0168356 A1* | 6/2014 | Francois | H04N 5/23238 348/37 |
| 2014/0210940 A1* | 7/2014 | Barnes | H04N 13/0022 348/36 |
| 2014/0375760 A1 | 12/2014 | Lee et al. | |
| 2015/0189175 A1* | 7/2015 | Fan | H04N 5/2251 348/37 |
| 2016/0014921 A1* | 1/2016 | Francois | H05K 5/0234 361/807 |

FOREIGN PATENT DOCUMENTS

| | | |
|---|---|---|
| CN | 102104641 A | 6/2011 |
| CN | 102272690 A | 12/2011 |
| CN | 102314179 A | 1/2012 |
| CN | 102420898 A | 4/2012 |
| CN | 102572258 A | 7/2012 |
| CN | 102591014 A | 7/2012 |
| CN | 103106335 A | 5/2013 |
| CN | 103176347 A | 6/2013 |
| CN | 103530799 A | 1/2014 |
| CN | 103543831 A | 1/2014 |
| CN | 103561209 A | 2/2014 |
| CN | 103841332 A | 6/2014 |
| CN | 104243805 A | 12/2014 |

OTHER PUBLICATIONS

Partial English Translation and Abstract of Chinese Patent Application No. CN102591014A, May 29, 2015, 4 pages.
Partial English Translation and Abstract of Chinese Patent Application No. CN103176347A, May 29, 2015, 8 pages.
Partial English Translation and Abstract of Chinese Patent Application No. CN103530799A, Jul. 27, 2015, 6 pages.
Partial English Translation and Abstract of Chinese Patent Application No. CN103543831A, May 29, 2015, 4 pages.
Partial English Translation and Abstract of Chinese Patent Application No. CN103841332A, May 29, 2015, 7 pages.
Partial English Translation and Abstract of Chinese Patent Application No. CN1589050A, 2015, 4 pages.
Foreign Communication From a Counterpart Application, PCT Application No. PCT/CN2014/079950, International Search Report dated Mar. 16, 2015, 10 pages.
Foreign Communication From a Counterpart Application, PCT Application No. PCT/CN2014/079950, Written Opinion dated Mar. 16, 2015, 5 pages.
Foreign Communication From a Counterpart Application, Chinese Application No. 201480001677.5, Chinese Office Action dated Nov. 30, 2016, 6 pages.

* cited by examiner

```
1    // Description (pseudocode) of a core algorithm of this IDEA
2    function panoramView(){
3        float θrealtime = 0°;   //Real-time angle by which an axis in a gyroscope rotates
4        float θz-last = 0°;     //Angle of a Z-axis when a displacement of a photo is triggered at a previous time
5        float θy-last = 0°;     //Angle of a Y-axis when the displacement of the photo is triggered at the previous time
6        float Δθ = 0°;          // Δθ is the real-time angle minus the angle when the displacement of the photo is triggered at the previous time
7        int Δd = (1°/Total rotation angle) * Photo width;   //Δd is an absolute value of a pixel value that the photo needs to be displaced once
                        of the photo                              the mobile photo rotates by 1°
8        SET{  Set a current state of each axis of the   0°};  // Initialize the gyroscope
                        gyroscope to
9
10       while ( A user exits an immersive      )
                      browsing mode
11       {
12           GET{ Status of a gravity sensor};  //Acquire a current state of the mobile phone: horizontality or verticality, where 45°
                                                  // may be selected for a status switchover threshold
13           if( The mobile phone ){
                    is horizontal
14               θrealtime = GET{ Current rotation angle of the    };
                                     Z-axis of the gyroscope
15               Δθ = θrealtime - θz-last;
16               if(Δθ == 1°){  // It is assumed that the rotation angle is a positive value when rotating clockwise, and each time a positive 1° is rotated,
                                    the photo is triggered to move leftwards for a minimum displacement
17                   Move the photo leftwards for the minimum   Δd;
                              displacement
18                   θz-last = θrealtime;
19               }
20               else if(Δθ == -1°){  // It is assumed that the rotation angle is a negative value when rotating counterclockwise, and each time a
                                          negative 1° is rotated, the photo is triggered to move rightwards for a minimum displacement
21                   Move the photo leftwards for the minimum   Δd;
                                displacement
22                   θz-last = θrealtime;
23               }
24           }
25           else if( The mobile ){
                       photo is vertical
                                      Current rotation angle of the
26               θrealtime = GET{     Y-axis of the gyroscope       };
27               Δθ = θrealtime - θy-last;
28               if(Δθ == 1°){  // It is assumed that the rotation angle is a positive value when rotating clockwise, and each time a positive 1° is rotated,
                                    the photo is triggered to move leftwards for a minimum displacement
29                   Move the photo leftwards for the minimum Δd;
                                displacement
30                   θy-last = θrealtime;
31               }
32               else if(Δθ == -1°){  // It is assumed that the rotation angle is a negative value when rotating counterclockwise, and each time a
                                          negative 1° is rotated, the photo is triggered to move rightwards for a minimum displacement
33                   Move the photo leftwards for the minimum Δd;
                                displacement
34                   θy-last = θrealtime;
35               }
36           }
37           if(  The user exits the immersive  ){
                        browsing mode
38               break;
39           }
40           pause{5ms};  // Assuming that a sampling rate of the gyroscope is 100Hz (a sampling interval is 10ms), to ensure
                             precision, this program only needs to be repeated once every 5ms
41       }
42   }
```

FIG. 8

METHOD AND APPARATUS FOR PRESENTING PANORAMIC PHOTO IN MOBILE TERMINAL, AND MOBILE TERMINAL

CROSS-REFERENCE TO RELATED APPLICATION

This application is a continuation of International Application No. PCT/CN2014/079950, filed on Jun. 16, 2014, which is incorporated herein by reference in its entirety.

TECHNICAL FIELD

The present invention relates to the field of communications technologies, and in particular, to a method and an apparatus for presenting a panoramic photo in a mobile terminal, and a mobile terminal.

BACKGROUND

With the rapid development of communications technologies, functions of a mobile terminal become increasingly powerful, and a range and an environment in which a mobile terminal is used become increasingly diverse. For example, currently, many mobile terminals such as mobile phones, personal digital assistants, and personal computers all have a function of panoramic photographing.

When a mobile terminal performs panoramic photographing, a user rotates the mobile terminal to photograph a scene that needs to be photographed. A basic principle of "panoramic photographing" is that edge parts of two photos are searched for, and registration is performed on areas that have closest imaging effects, so as to complete automatic stitching of the photos. Multiple photographed photos may be then stitched as one panoramic photo according to the foregoing stitching principle, and a vision of a scene recorded in the panoramic photo is relatively broad. When browsing a photo, a user may browse relatively rich image content on a panoramic photo, which features a relatively strong visual impact.

However, although currently, relatively rich photo content can be recorded in a panoramic photo, the photo is relatively large when the panoramic photo is presented in a mobile terminal. When browsing the panoramic photo, a user needs to manually slide the photo to browse the photo content, which is relatively complex in terms of operations.

SUMMARY

Embodiments of the present invention provide a method and an apparatus for presenting a panoramic photo in a mobile terminal, and a mobile terminal, so as to reduce complexity of panoramic photo browsing, and make it convenient for a user to browse a panoramic photo.

According to a first aspect, a method for presenting a panoramic photo in a mobile terminal is provided, including detecting a trigger instruction that is used to instruct the mobile terminal to enter an immersive browsing mode, where the immersive browsing mode is a browsing mode in which a panoramic photo moves as the mobile terminal rotates, if the trigger instruction is detected, detecting and determining a rotation angle of the mobile terminal, and moving and presenting, according to the determined rotation angle, a panoramic photo that is displayed in a normal mode in the mobile terminal.

With reference to the first aspect, in a first implementation manner, the determining a rotation angle of the mobile terminal includes determining a placement direction in which the mobile terminal is located in a rotation process, and determining the rotation angle of the mobile terminal according to the placement direction.

With reference to the first implementation manner of the first aspect, in a second implementation manner, the determining a placement direction in which the mobile terminal is located in a rotation process includes detecting an angle of a gravity direction of the mobile terminal with respective to a direction of an X-Y plane of a reference three-dimensional coordinate system, where the X-Y plane of the reference three-dimensional coordinate system is parallel to a plane in which a screen of the mobile terminal is located, and a Z-axis of the reference three-dimensional coordinate system is perpendicular to the plane in which the screen of the mobile terminal is located, and determining, according to the angle of the gravity direction of the mobile terminal with respective to the direction of the X-Y plane of the reference three-dimensional coordinate system, the placement direction in which the mobile terminal is located in the rotation process.

With reference to the second implementation manner of the first aspect, in a third implementation manner, the determining, according to the angle of the gravity direction of the mobile terminal with respective to the direction of the X-Y plane of the reference three-dimensional coordinate system, the placement direction in which the mobile terminal is located in the rotation process includes when the angle of the gravity direction of the mobile terminal with respective to the direction of the X-Y plane of the reference three-dimensional coordinate system is not greater than 45 degrees, determining that the placement direction in which the mobile terminal is located in the rotation process is a vertical placement direction; and when the angle of the gravity direction of the mobile terminal with respective to the direction of the X-Y plane of the reference three-dimensional coordinate system is greater than 45 degrees, determining that the placement direction in which the mobile terminal is located in the rotation process is a horizontal placement direction.

With reference to the second implementation manner of the first aspect or the third implementation manner of the first aspect, in a fourth implementation manner, the determining the rotation angle of the mobile terminal according to the placement direction includes if it is determined that the placement direction in which the mobile terminal is located in the rotation process is the horizontal placement direction, using a direction of the Z-axis in the reference three-dimensional coordinate system as a corresponding axial direction of the mobile terminal in the rotation process; and using an angle by which the mobile terminal rotates with respective to the axial direction as the rotation angle of the mobile terminal, or if it is determined that the placement direction in which the mobile terminal is located in the rotation process is the vertical placement direction, using a direction of an X-axis or a direction of a Y-axis in the reference three-dimensional coordinate system as a corresponding axial direction of the mobile terminal in the rotation process, and using an angle by which the mobile terminal rotates with respective to the axial direction as the rotation angle of the mobile terminal.

With reference to any one of the foregoing implementation manners of the first aspect, in a fifth implementation manner, before the moving, according to the determined rotation angle, a panoramic photo that is presented in a normal mode in the mobile terminal, the method further includes determining that the rotation angle of the mobile terminal reaches a preset rotation angle threshold.

With reference to the fifth implementation manner of the first aspect, in a sixth implementation manner, before the moving, according to the determined rotation angle, a panoramic photo that is presented in a normal mode in the mobile terminal, the method further includes determining a minimum displacement of the panoramic photo according to the preset rotation angle threshold, a rotation angle of the mobile terminal when the panoramic photo is photographed, and a photo width of the panoramic photo along a rotation direction of the mobile terminal when the panoramic photo is photographed, and the moving a panoramic photo that is presented in a normal mode in the mobile terminal includes moving the panoramic photo for the minimum displacement along a direction opposite to the rotation direction of the mobile terminal.

With reference to the first aspect, in a seventh implementation manner, before the detecting and determining a rotation angle of the mobile terminal, the method further includes providing prompt information that is used to instruct to rotate the mobile terminal.

With reference to the seventh implementation manner of the first aspect, in an eighth implementation manner, before the providing prompt information that is used to instruct to rotate the mobile terminal, the method further includes acquiring a rotation direction of the mobile terminal that is saved when the panoramic photo is photographed, and the providing prompt information that is used to instruct to rotate the mobile terminal includes providing the prompt information that is used to instruct to rotate the mobile terminal according to the acquired rotation direction.

According to a second aspect, an apparatus for presenting a panoramic photo in a mobile terminal is provided, including a detecting unit, a determining unit, and a presenting unit, where the detecting unit is configured to detect a trigger instruction that is used to instruct the mobile terminal to enter an immersive browsing mode; and when the trigger instruction that is used to instruct the mobile terminal to enter the immersive browsing mode is detected, transmit a detection result to the determining unit, where the immersive browsing mode is a browsing mode in which a panoramic photo moves as the mobile terminal rotates, the determining unit is configured to receive the detection result transmitted by the detecting unit, and if the detection result is that the trigger instruction is detected, detect and determine a rotation angle of the mobile terminal, and transmit the determined rotation angle of the mobile terminal to the presenting unit, and the presenting unit is configured to receive the rotation angle of the mobile terminal determined by the determining unit; and move and present, according to the determined rotation angle, a panoramic photo that is presented in a normal mode in the mobile terminal.

With reference to the second aspect, in a first implementation manner, the determining unit is specifically configured to determine the rotation angle of the mobile terminal in the following manner, determining a placement direction in which the mobile terminal is located in a rotation process, and determining the rotation angle of the mobile terminal according to the placement direction.

With reference to the first implementation manner of the second aspect, in a second implementation manner, the determining unit is specifically configured to determine, in the following manner, the placement direction in which the mobile terminal is located in the rotation process detecting an angle of a gravity direction of the mobile terminal with respective to a direction of an X-Y plane of a reference three-dimensional coordinate system, where the X-Y plane of the reference three-dimensional coordinate system is parallel to a plane in which a screen of the mobile terminal is located, and a Z-axis of the reference three-dimensional coordinate system is perpendicular to the plane in which the screen of the mobile terminal is located, and determining, according to the angle of the gravity direction of the mobile terminal with respective to the direction of the X-Y plane of the reference three-dimensional coordinate system, the placement direction in which the mobile terminal is located in the rotation process.

With reference to the second implementation manner of the second aspect, in a third implementation manner, the determining unit is specifically configured to determine, in the following manner, according to the angle of the gravity direction of the mobile terminal with respective to the direction of the X-Y plane of the reference three-dimensional coordinate system, the placement direction in which the mobile terminal is located in the rotation process, when the angle of the gravity direction of the mobile terminal with respective to the direction of the X-Y plane of the reference three-dimensional coordinate system is not greater than 45 degrees, determining that the placement direction in which the mobile terminal is located in the rotation process is a vertical placement direction, and when the angle of the gravity direction of the mobile terminal with respective to the direction of the X-Y plane of the reference three-dimensional coordinate system is greater than 45 degrees, determining that the placement direction in which the mobile terminal is located in the rotation process is a horizontal placement direction.

With reference to the second implementation manner of the second aspect or the third implementation manner of the second aspect, in a fourth implementation manner, the determining unit is specifically configured to determine, in the following manner, the rotation angle of the mobile terminal according to the placement direction if it is determined that the placement direction in which the mobile terminal is located in the rotation process is the horizontal placement direction, using a direction of the Z-axis in the reference three-dimensional coordinate system as a corresponding axial direction of the mobile terminal in the rotation process, and using an angle by which the mobile terminal rotates with respective to the axial direction as the rotation angle of the mobile terminal, or if it is determined that the placement direction in which the mobile terminal is located in the rotation process is the vertical placement direction, using a direction of an X-axis or a direction of a Y-axis in the reference three-dimensional coordinate system as a corresponding axial direction of the mobile terminal in the rotation process, and using an angle by which the mobile terminal rotates with respective to the axial direction as the rotation angle of the mobile terminal.

With reference to any one of the foregoing implementation manners of the second aspect, in a fifth implementation manner, the apparatus further includes a judging unit, where the judging unit determines, before the presenting unit moves, according to the determined rotation angle, the panoramic photo that is presented in the normal mode in the mobile terminal, that the rotation angle of the mobile terminal reaches a preset rotation angle threshold.

With reference to the fifth implementation manner of the second aspect, in a sixth implementation manner, the determining unit is further configured to before the presenting unit moves, according to the determined rotation angle, the panoramic photo that is presented in the normal mode in the mobile terminal, determine a minimum displacement of the panoramic photo according to the preset rotation angle threshold, a rotation angle of the mobile terminal when the panoramic photo is photographed, and a photo width of the panoramic photo along a rotation direction of the mobile terminal when the panoramic photo is photographed; and the presenting unit is specifically configured to move, in the following manner, the panoramic photo that is presented in the normal mode in the mobile terminal moving the panoramic photo for the minimum displacement along a direction opposite to the rotation direction of the mobile terminal.

With reference to the second aspect, in a seventh implementation manner, the apparatus further includes a prompting unit, where the prompting unit is configured to receive the detection result transmitted by the detecting unit; and when the detection result is that the trigger instruction that is used to instruct the mobile terminal to enter the immersive browsing mode is detected by the detecting unit, provide prompt information that is used to instruct to rotate the mobile terminal.

With reference to the seventh implementation manner of the second aspect, in an eighth implementation manner, the apparatus further includes an acquiring unit, where the acquiring unit is configured to acquire a rotation direction of the mobile terminal that is saved when the panoramic photo is photographed, and transmit, to the prompting unit, the acquired rotation direction of the mobile terminal that is saved when the photo is photographed, and the prompting unit is specifically configured to provide, in the following manner, the prompt information that is used to instruct to rotate the mobile terminal providing the prompt information that is used to instruct to rotate the mobile terminal according to the rotation direction acquired by the acquiring unit.

According to a third aspect, a mobile terminal is provided, including an input device, a sensor, a processor, and a display screen, where the display screen is configured to present a panoramic photo, the input device is configured to input a trigger instruction that is used to instruct the mobile terminal to enter an immersive browsing mode, where the immersive browsing mode is a browsing mode in which a panoramic photo moves as the mobile terminal rotates, the sensor is configured to detect a rotation angle of the mobile terminal, and the processor is configured to, when it is detected that the trigger instruction is input by the input device, move, according to the rotation angle determined by means of detection, a panoramic photo that is presented in a normal mode in the mobile terminal.

With reference to the third aspect, in a first implementation manner, the sensor is configured to determine a placement direction in which the mobile terminal is located in a rotation process, and determine the rotation angle of the mobile terminal according to the placement direction.

With reference to the first implementation manner of the third aspect, in a second implementation manner, the sensor is specifically configured to determine, in the following manner, the placement direction in which the mobile terminal is located in the rotation process detecting an angle of a gravity direction of the mobile terminal with respective to a direction of an X-Y plane of a reference three-dimensional coordinate system, where the X-Y plane of the reference three-dimensional coordinate system is parallel to a plane in which a screen of the mobile terminal is located, and a Z-axis of the reference three-dimensional coordinate system is perpendicular to the plane in which the screen of the mobile terminal is located, and determining, according to the angle of the gravity direction of the mobile terminal with respective to the direction of the X-Y plane of the reference three-dimensional coordinate system, the placement direction in which the mobile terminal is located in the rotation process.

With reference to the second implementation manner of the third aspect, in a third implementation manner, the sensor is specifically configured to determine, in the following manner, according to the angle of the gravity direction of the mobile terminal with respective to the direction of the X-Y plane of the reference three-dimensional coordinate system, the placement direction in which the mobile terminal is located in the rotation process when the angle of the gravity direction of the mobile terminal with respective to the direction of the X-Y plane of the reference three-dimensional coordinate system is not greater than 45 degrees, determining that the placement direction in which the mobile terminal is located in the rotation process is a vertical placement direction, and when the angle of the gravity direction of the mobile terminal with respective to the direction of the X-Y plane of the reference three-dimensional coordinate system is greater than 45 degrees, determining that the placement direction in which the mobile terminal is located in the rotation process is a horizontal placement direction.

With reference to the second implementation manner of the third aspect or the third implementation manner of the third aspect, in a fourth implementation manner, the sensor is specifically configured to determine, in the following manner, the rotation angle of the mobile terminal according to the placement direction, if it is determined that the placement direction in which the mobile terminal is located in the rotation process is the horizontal placement direction, using a direction of the Z-axis in the reference three-dimensional coordinate system as a corresponding axial direction of the mobile terminal in the rotation process, and using an angle by which the mobile terminal rotates with respective to the axial direction as the rotation angle of the mobile terminal, or if it is determined that the placement direction in which the mobile terminal is located in the rotation process is the vertical placement direction, using a direction of an X-axis or a direction of a Y-axis in the reference three-dimensional coordinate system as a corresponding axial direction of the mobile terminal in the rotation process, and using an angle by which the mobile terminal rotates with respective to the axial direction as the rotation angle of the mobile terminal.

With reference to any one of the foregoing implementation manners of the third aspect, in a fifth implementation manner, the processor is further configured to before moving, according to the determined rotation angle, the panoramic photo that is presented in the normal mode in the mobile terminal, determine that the rotation angle of the mobile terminal reaches a preset rotation angle threshold.

With reference to the fifth implementation manner of the third aspect, in a sixth implementation manner, the processor is further configured to before moving, according to the determined rotation angle, the panoramic photo that is presented in the normal mode in the mobile terminal, determine a minimum displacement of the panoramic photo according to the preset rotation angle threshold, a rotation angle of the mobile terminal when the panoramic photo is photographed, and a photo width of the panoramic photo along a rotation direction of the mobile terminal when the panoramic photo is photographed, and the processor is specifically configured to move, in the following manner, the panoramic photo that is presented in the normal mode in the mobile terminal moving the panoramic photo for the minimum displacement along a direction opposite to the rotation direction of the mobile terminal.

With reference to the third aspect, in a seventh implementation manner, the processor is further configured to when it is detected that the trigger instruction is input by the input device, provide prompt information that is used to instruct to rotate the mobile terminal.

With reference to the seventh implementation manner of the third aspect, in an eighth implementation manner, the processor is further configured to before providing the prompt information that is used to instruct to rotate the mobile terminal, acquire a rotation direction of the mobile terminal that is saved when the panoramic photo is photographed, and the processor is specifically configured to provide, in the following manner, the prompt information that is used to instruct to rotate the mobile terminal providing the prompt information that is used to instruct to rotate the mobile terminal according to the acquired rotation direction.

According to a method and an apparatus for presenting a panoramic photo in a mobile terminal, and a mobile terminal that are provided in the embodiments of the present invention, when a trigger instruction that is used to instruct the mobile terminal to enter an immersive browsing mode is detected, a rotation angle of the mobile terminal is detected and determined; and a panoramic photo that is displayed in a normal mode in the mobile terminal is moved and presented according to the determined rotation angle. By using the present invention, a panoramic photo may be enabled to move as a mobile terminal rotates, so that browsing of the panoramic photo may be implemented without requiring manual sliding on a screen of the mobile terminal, which is easy and convenient in terms of operations.

BRIEF DESCRIPTION OF DRAWINGS

To describe the technical solutions in the embodiments of the present invention more clearly, the following briefly introduces the accompanying drawings required for describing the embodiments.

FIG. 8 is a schematic diagram of implementation of a program for presenting a panoramic photo in a mobile terminal according to an embodiment of the present invention.

DESCRIPTION OF EMBODIMENTS

The following clearly describes the technical solutions in the embodiments of the present invention with reference to the accompanying drawings in the embodiments of the present invention. The described embodiments are some but not all of the embodiments of the present invention. All other embodiments obtained by persons of ordinary skill in the art based on the embodiments of the present invention without creative efforts shall fall within the protection scope of the present invention.

According to a method for presenting a panoramic photo in a mobile terminal provided in the embodiments of the present invention, a panoramic photo moves as the mobile terminal rotates. For ease of description in the embodiments of the present invention, a browsing mode in which a panoramic photo moves as the mobile terminal rotates is referred to as an "immersive browsing mode", and a browsing mode of a panoramic photo in the prior art is referred to as a normal mode in the following, which is certainly not limited thereto; for example, the "immersive browsing mode" may also be referred to as "panorama browsing mode". When browsing a panoramic photo that is displayed in a normal mode in the mobile terminal, a user may choose to enter the immersive browsing mode. In the immersive browsing mode, the panoramic photo may be browsed by rotating the mobile terminal, and it is not required to manually slide on a screen of the mobile terminal to browse the panoramic photo.

Figure 1:
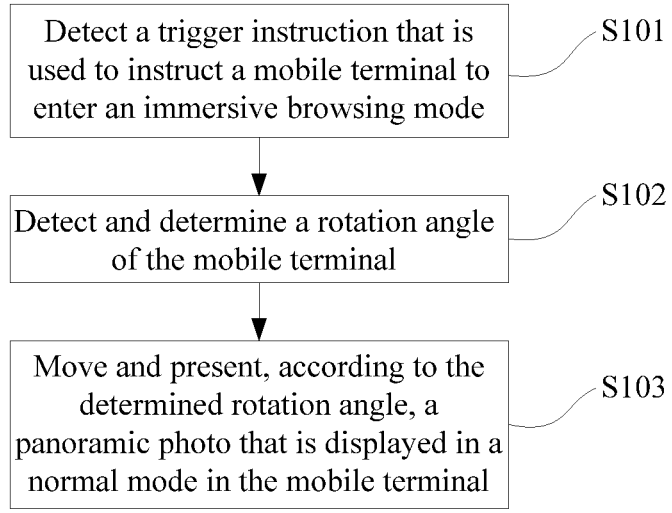
FIG. 1 is a flowchart of implementation of a method for presenting a panoramic photo in a mobile terminal according to an embodiment of the present invention.

FIG. 1 shows a flowchart of implementation of a method for presenting a panoramic photo in a mobile terminal according to an embodiment of the present invention. The method may be performed by a mobile terminal, or specifically by components in the mobile terminal. As shown in FIG. 1, the method includes the following steps:

S101: Detect a trigger instruction that is used to instruct the mobile terminal to enter an immersive browsing mode.

In this embodiment of the present invention, if the trigger instruction that is used to instruct the mobile terminal to enter the immersive browsing mode is detected, S102 is performed.

S102: Detect and determine a rotation angle of the mobile terminal.

S103: Move and present, according to the rotation angle determined in S102, a panoramic photo that is displayed in a normal mode in the mobile terminal.

According to the method for presenting a panoramic photo in a mobile terminal provided in this embodiment of the present invention, when a trigger instruction that is used to instruct the mobile terminal to enter an immersive browsing mode is detected, a rotation angle of the mobile terminal is detected and determined; and a panoramic photo that is displayed in a normal mode in the mobile terminal is moved and presented according to the determined rotation angle. By using the present invention, a panoramic photo may be enabled to move as a mobile terminal rotates, so that browsing of the panoramic photo may be implemented without requiring manual sliding on a screen of the mobile terminal, which is easy and convenient in terms of operations.

In this embodiment of the present invention, there may be multiple implementation manners for specifically implementing a rotation process of the mobile terminal. For example, a user may rotate the mobile terminal in a predefined manner immediately after the user triggers the mobile terminal to enter the immersive browsing mode, where the predefined manner may be obtained, for example, by pre-learning from a user manual. For example, after the user triggers the mobile terminal to enter the immersive browsing mode, the mobile terminal may further provide prompt information that is used to instruct to rotate the mobile terminal, so as to prompt the user to perform rotation.

An implementation manner in which a mobile terminal provides prompt information that is used to instruct to rotate the mobile terminal is used as an example in an embodiment of the present invention in the following to describe in detail the method for presenting a panoramic photo in a mobile terminal involved in the foregoing embodiment.

Figure 2:
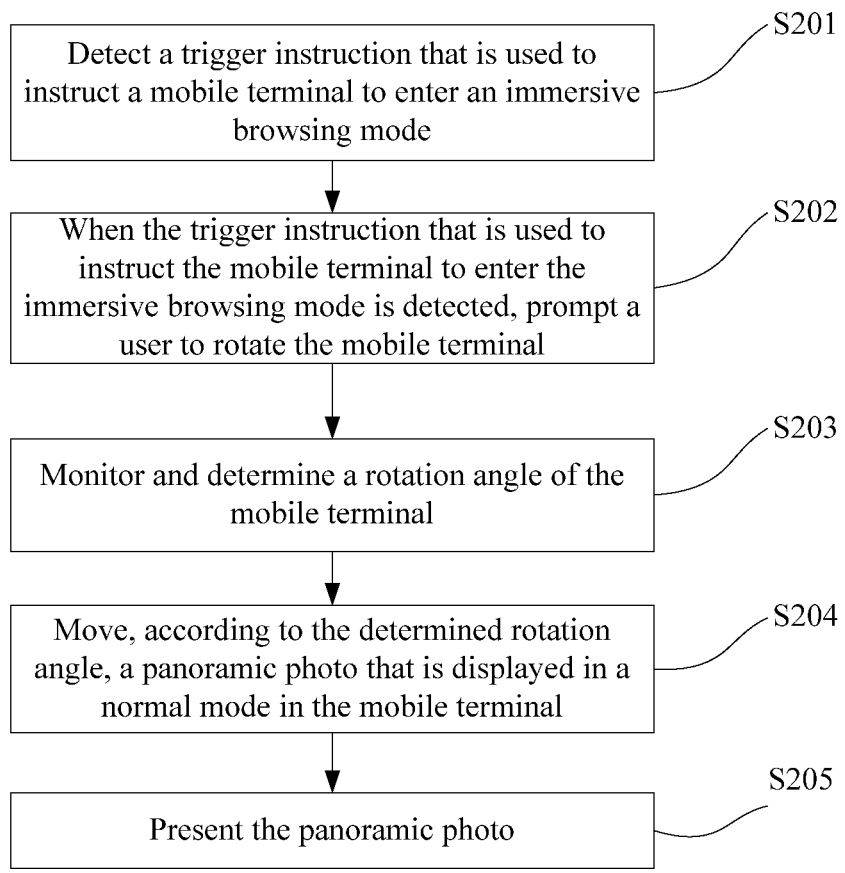
FIG. 2 is another flowchart of implementation of a method for presenting a panoramic photo in a mobile terminal according to an embodiment of the present invention.

FIG. 2 shows another flowchart of implementation of a method for presenting a panoramic photo in a mobile terminal according to an embodiment of the present invention. The method may be performed by a mobile terminal, or specifically by components in the mobile terminal. As shown in FIG. 2, the method includes the following steps:

S201: Detect a trigger instruction that is used to instruct the mobile terminal to enter an immersive browsing mode.

In this embodiment of the present invention, a user may input, by using a display screen or a key of the mobile terminal, the trigger instruction that is used to instruct the mobile terminal to enter the immersive browsing mode. For example, in this embodiment of the present invention, an enabling control used to enable the immersive browsing mode may be set on a display interface of the mobile terminal. An enabling status of the enabling control is used to determine whether to enable the immersive browsing mode, and when it is detected that the enabling control is enabled, it can be determined that the mobile terminal needs to enter the immersive browsing mode. For example, an immersive browsing button is set on the display interface of the mobile terminal. When choosing to enter the immersive browsing mode to browse a panoramic photo, the user can trigger the button, to instruct the mobile terminal to enter the immersive browsing mode; and if the mobile terminal receives the trigger instruction, it may be considered that the user needs to browse the panoramic photo in the immersive browsing mode.

Optionally, in this embodiment of the present invention, the user may be further prompted, when it is detected that the user is browsing a panoramic photo, to trigger the enabling control that is used to instruct to enable the immersive browsing mode.

S202: When the trigger instruction that is used to instruct the mobile terminal to enter the immersive browsing mode is detected, provide prompt information that is used to instruct to rotate the mobile terminal.

In this embodiment of the present invention, in order to implement immersive mode browsing, the user needs to rotate the mobile terminal, so that the panoramic photo can move as the mobile terminal rotates. Generally, for better browsing of the panoramic photo, the prompt information that is used to instruct to rotate the mobile terminal may be provided to notify the user that the mobile terminal needs to be rotated according to a preset direction, where the preset direction may be, for example, rotating from left to right, and certainly, may also be rotating from right to left.

In this embodiment of the present invention, the provided prompt information may be text information displayed on the display interface, and certainly, may also be voice information notified by means of a voice output, which is not specifically limited in this embodiment of the present invention.

Optionally, in this embodiment of the present invention, a rotation direction of the mobile terminal that is saved when the panoramic photo is photographed may be further acquired, and the acquired rotation direction is notified in a form of prompt information; prompt information that is used to instruct to rotate the mobile terminal according to the notified rotation direction is provided to prompt the user to rotate the mobile terminal according to the acquired rotation direction of the mobile terminal that is saved when the panoramic photo is photographed.

S203: Detect and determine a rotation angle of the mobile terminal.

In this embodiment of the present invention, the rotation angle of the mobile terminal is detected in real time, so as to control, in a timely manner, the panoramic photo to move.

When photographing the panoramic photo, the user generally positions the mobile terminal in a determined placement direction. However, when browsing the panoramic photo, the user may be much likely to use a placement direction different from the determined placement direction in photographing the panoramic photo to browse the panoramic photo. Therefore, in this embodiment of the present invention, in order to browse the panoramic photo in a relatively precise manner, the rotation angle of the mobile terminal may be determined according to a placement direction in which the mobile terminal is located in a rotation process.

Figure 3:
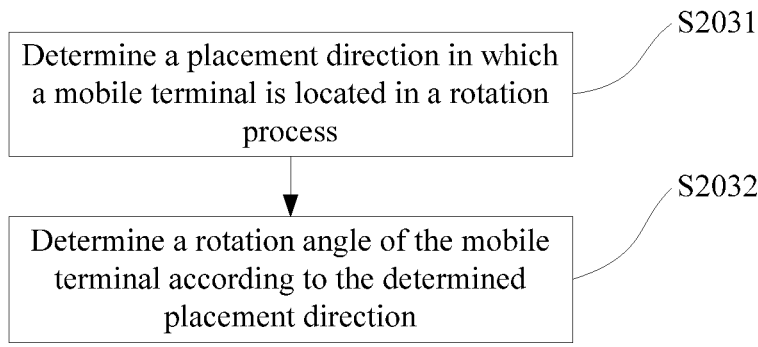
FIG. 3 is a schematic diagram of a process of determining a rotation angle of a mobile terminal according to an embodiment of the present invention.

A process of determining the rotation angle of the mobile terminal in S203 in this embodiment of the present invention may use the following manner for the determining as shown in FIG. 3.

S2031: Determine a placement direction in which the mobile terminal is located in a rotation process.

S2032: Determine a rotation angle of the mobile terminal according to the placement direction determined in S2031.

In this embodiment of the present invention, the placement direction in which the mobile terminal is located may be determined by using a gravity direction of the mobile terminal indicated by a gravity sensor disposed in the mobile terminal, and the rotation angle of the mobile terminal is determined by using an angle of a gyro sensor disposed in the mobile terminal. Optionally, in this embodiment of the present invention, the gravity sensor used to determine the placement direction of the mobile terminal and the gyro sensor used to determine the rotation angle of the mobile terminal may be enabled when the trigger instruction that is used to instruct the mobile terminal to enter the immersive browsing mode is detected.

Figure 4:
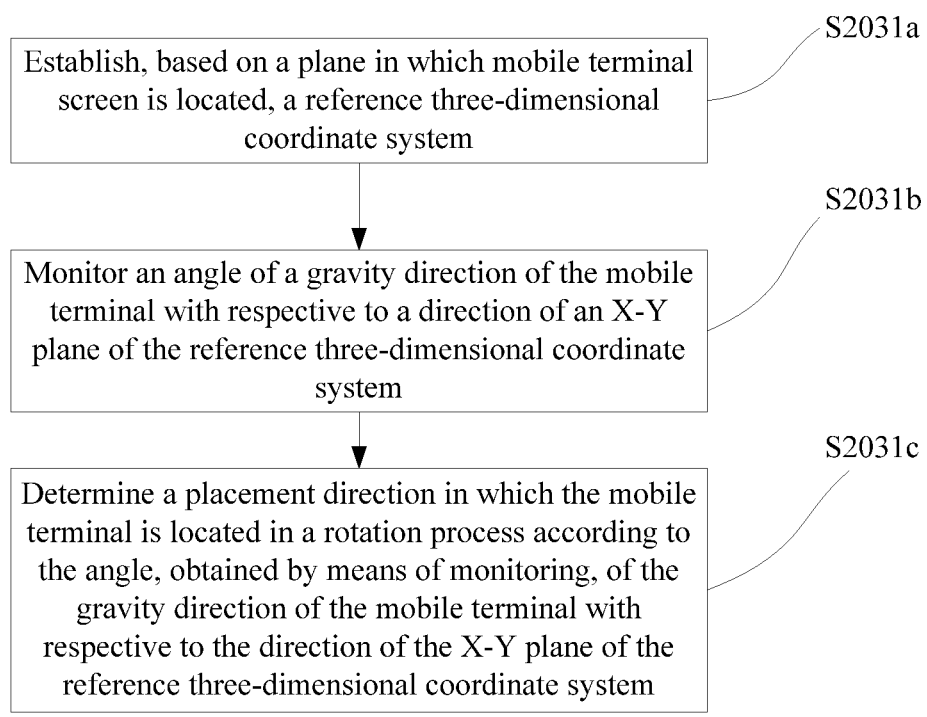
FIG. 4 is a schematic diagram of implementation of determining a placement direction in which a mobile terminal is located in a rotation process according to an embodiment of the present invention.

Optionally, the determining the placement direction in which the mobile terminal is located in the rotation process in S2031 in this embodiment of the present invention may use a method shown in FIG. 4 for the determining. As shown in FIG. 4, the method includes the following steps:

S2031a: Establish, based on a plane in which a screen of the mobile terminal is located, a reference three-dimensional coordinate system.

In this embodiment of the present invention, the reference three-dimensional coordinate system may be established based on the plane in which the screen of the mobile terminal is located, where an X-Y plane of the reference three-dimensional coordinate system is parallel to the plane in which the screen of the mobile terminal is located, and a Z-axis of the reference three-dimensional coordinate system is perpendicular to the plane in which the screen of the mobile terminal is located.

Figure 5A:
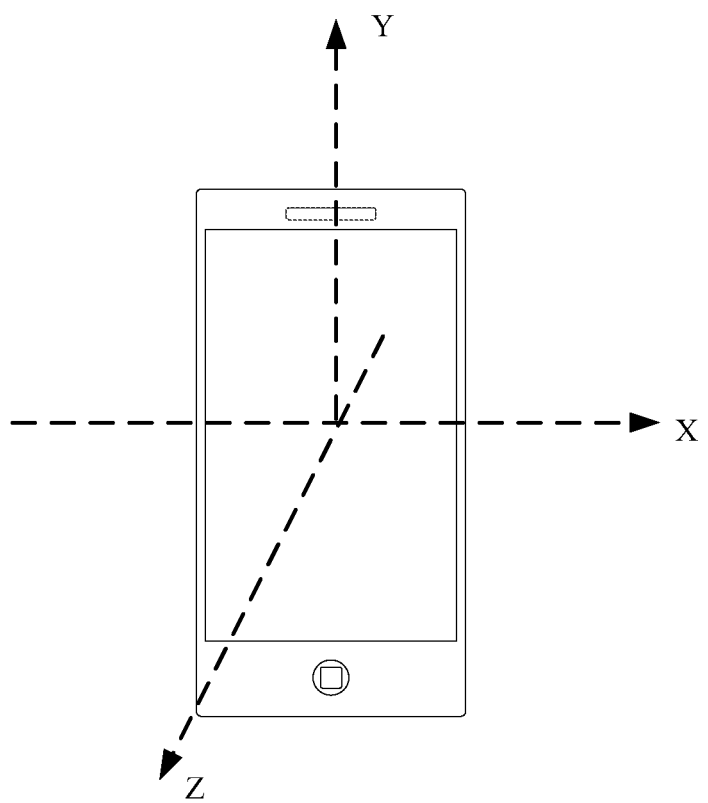
FIG. 5A and FIG. 5B are schematic diagrams of placement directions of a mobile terminal involved in an embodiment of the present invention.
Figure 5B:
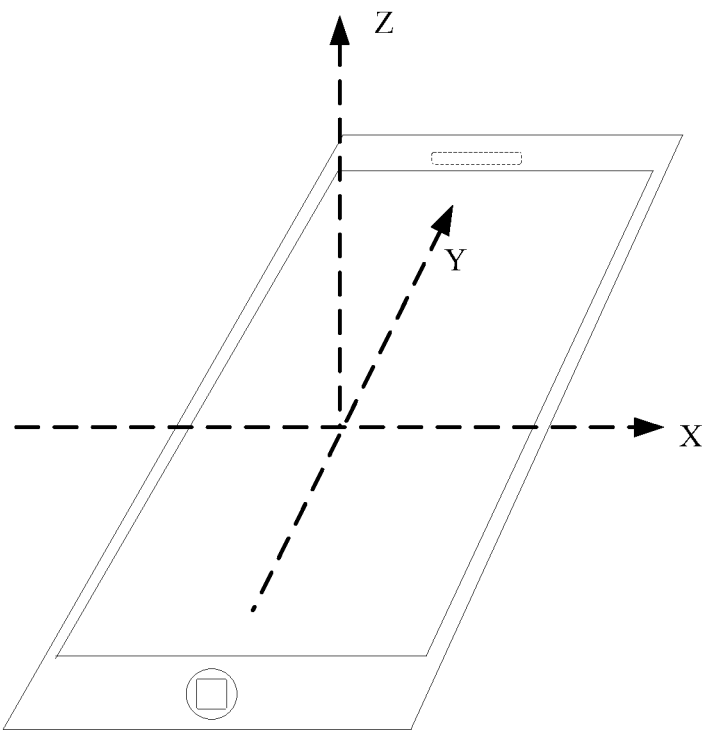

The mobile terminal is located at different placement directions in the rotation process, and a corresponding reference three-dimensional coordinate system also rotates according to the different placement directions of the mobile terminal. For example, schematic diagrams of reference three-dimensional coordinate systems are separately corresponding to a vertical placement direction in FIG. 5A and a horizontal placement direction in FIG. 5B.

S2031b: Detect an angle of a gravity direction of the mobile terminal with respective to a direction of an X-Y plane of the reference three-dimensional coordinate system established in S2031a.

S2031c: Determine the placement direction in which the mobile terminal is located in the rotation process according to the angle, obtained by means of detection in S2031b, of the gravity direction of the mobile terminal with respective to the direction of the X-Y plane of the reference three-dimensional coordinate system.

Optionally, in this embodiment of the present invention, in order to simplify a control process of controlling presentation of the panoramic photo, when the angle of the gravity direction of the mobile terminal with respective to the direction of the X-Y plane of the reference three-dimensional coordinate system is not greater than 45 degrees, it may be determined that the placement direction in which the mobile terminal is located in the rotation process is a vertical placement direction; and when the angle of the gravity direction of the mobile terminal with respective to the direction of the X-Y plane of the reference three-dimensional coordinate system is greater than 45 degrees, it may be determined that the placement direction in which the mobile terminal is located in the rotation process is a horizontal placement direction.

It should be noted that in this embodiment of the present invention, when the angle of the gravity direction of the mobile terminal with respective to the direction of the X-Y plane of the reference three-dimensional coordinate system is equal to 45 degrees, it may be determined that the placement direction in which the mobile terminal is located is the vertical placement direction, or is the horizontal placement direction, and may be specifically set to the vertical placement direction in this embodiment of the present invention.

Figure 6:
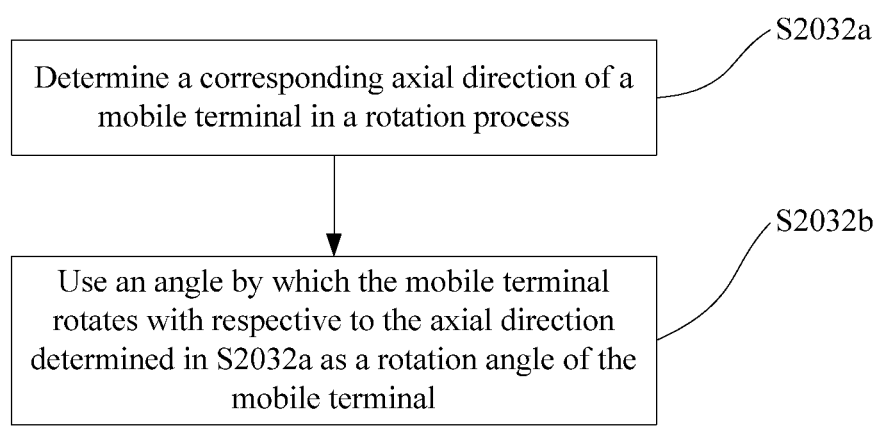
FIG. 6 is a schematic diagram of implementation of determining a rotation angle of a mobile terminal according to a placement direction according to an embodiment of the present invention.

In this embodiment of the present invention, if the placement direction in which the mobile terminal is located in the rotation process is determined by using the angle of the gravity direction of the mobile terminal with respective to the direction of the X-Y plane of the reference three-dimensional coordinate system in S2031, a determining manner shown in FIG. 6 may be used when determining the rotation angle of the mobile terminal is performed in S2032:

S2032a: Determine a corresponding axial direction of the mobile terminal in the rotation process.

In this embodiment of the present invention, when it is determined that the placement direction in which the mobile terminal is located in the rotation process is the horizontal placement direction, a direction of the Z-axis in the reference three-dimensional coordinate system is used as the corresponding axial direction of the mobile terminal in the rotation process; or when it is determined that the placement direction in which the mobile terminal is located in the rotation process is the vertical placement direction, a direction of an X-axis or a direction of a Y-axis in the reference three-dimensional coordinate system is used as the corresponding axial direction of the mobile terminal in the rotation process.

It should be noted that in this embodiment of the present invention, the foregoing corresponding axial direction of the mobile terminal in the rotation process is merely to simplify a process of determining the rotation angle of the mobile terminal, and a specific determining manner is not limited thereto.

S2032b: Use an angle by which the mobile terminal rotates with respective to the axial direction determined in S2032a as the rotation angle of the mobile terminal.

In this embodiment of the present invention, the gyro sensor used to determine the rotation angle of the mobile terminal may be enabled when the trigger instruction that is used to instruct the mobile terminal to enter the immersive browsing mode is detected. An angle by which the gyro sensor disposed on the mobile terminal rotates with respective to the axial direction is detected, and the rotation angle of the mobile terminal with respective to the corresponding axial direction is determined according to the angle by which the gyro sensor rotates.

S204: Move, according to the determined rotation angle of the mobile terminal, a panoramic photo that is displayed in a normal mode in the mobile terminal.

In this embodiment of the present invention, when a panoramic photo is browsed, the panoramic photo is generally first displayed in a normal browsing mode; for example, it may be that a panoramic photo with a relatively low resolution, or only a part of the panoramic photo such as a leftmost part of the panoramic photo or a rightmost part of the panoramic photo is displayed in a display screen of the mobile terminal. In this embodiment of the present invention, after the rotation angle of the mobile terminal is determined, the panoramic photo that is displayed in the normal mode in the mobile terminal may be moved to implement immersive browsing of the panoramic photo.

Optionally, in this embodiment of the present invention, multiple implementation manners may be used for moving the panoramic photo that is displayed in the normal mode in the mobile terminal. For example, the panoramic photo that is displayed in the normal mode in the mobile terminal may be moved along a direction the same as the rotation direction of the mobile terminal, and the panoramic photo may also be moved along a direction opposite to the rotation direction of the mobile terminal. In this embodiment of the present invention, in order to implement a better display effect, preferably, the panoramic photo that is displayed in the normal mode in the mobile terminal is moved along the direction opposite to the rotation direction of the mobile terminal.

Optionally, in this embodiment of the present invention, in order to implement smooth moving of the panoramic photo, a rotation angle threshold may be preset, and before S204 is performed, it is determined that the rotation angle of the mobile terminal reaches the preset rotation angle threshold. When the panoramic photo is browsed in the immersive browsing mode, the rotation angle of the mobile terminal is detected in real time; and when the rotation angle of the mobile terminal reaches the preset rotation angle threshold, the panoramic photo is controlled to move, which implements smooth moving of the panoramic photo. If the preset rotation angle threshold is not reached, the panoramic photo may not be moved.

Figure 7:
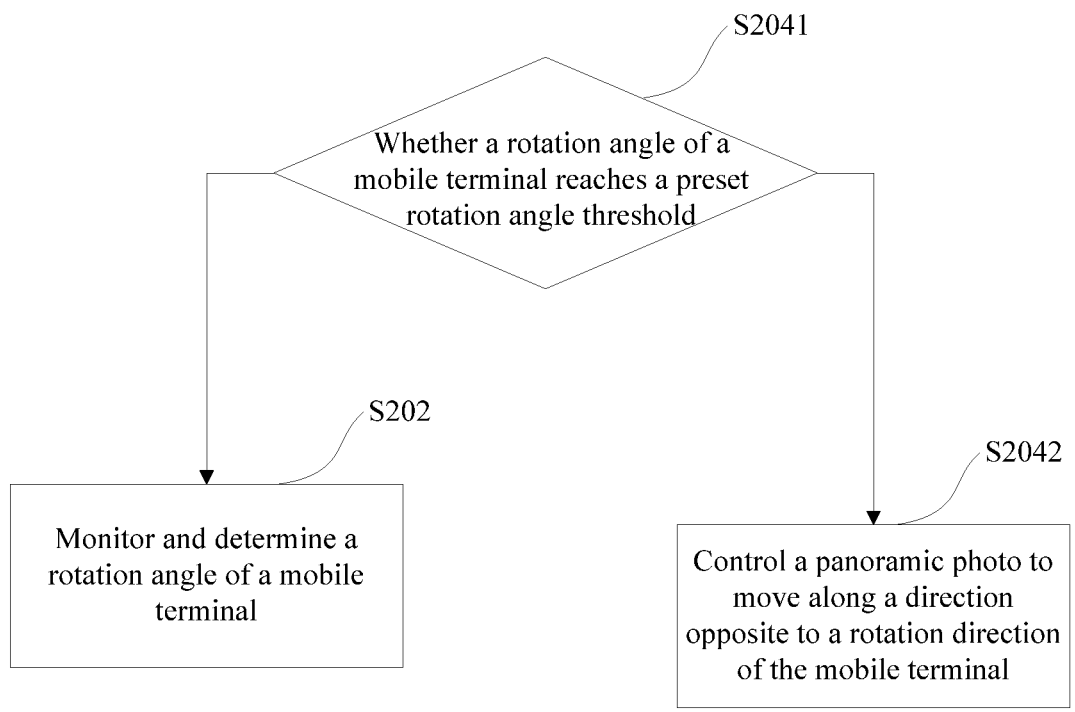
FIG. 7 is a schematic diagram of implementation of controlling, according to a determined rotation angle of a mobile terminal, a panoramic photo to move along a direction opposite to a rotation direction of the mobile terminal according to an embodiment of the present invention.

In this embodiment of the present invention, the moving, according to the determined rotation angle of the mobile terminal, the panoramic photo that is displayed in the normal mode in the mobile terminal along the direction opposite to the rotation direction of the mobile terminal in S204 may use an implementation manner shown in FIG. 7 (when the panoramic photo is moved along the direction the same as the rotation direction of the mobile terminal, a similar manner may also be used):

S2041: Determine whether the rotation angle of the mobile terminal reaches the preset rotation angle threshold; if the rotation angle of the mobile terminal reaches the preset rotation angle threshold, perform S2042; otherwise, perform S202 to detect the rotation angle of the mobile terminal.

S2042: When the rotation angle reaches the preset rotation angle threshold, move the panoramic photo that is displayed in the normal mode in the mobile terminal along a direction opposite to the rotation direction of the mobile terminal.

Optionally, in this embodiment of the present invention, in order to further enhance an effect of smooth moving, a minimum displacement may be further determined, and when being controlled to move along the direction opposite to the rotation direction of the mobile terminal, the panoramic photo is moved for the determined minimum displacement each time. A unit of the minimum displacement is pixel.

In this embodiment of the present invention, the minimum displacement of the panoramic photo may be determined according to the preset rotation angle threshold, a rotation angle of the mobile terminal when the panoramic photo is photographed, and a photo width of the panoramic photo along a rotation direction of the mobile terminal when the panoramic photo is photographed. The rotation angle of the mobile terminal when the panoramic photo is photographed and the photo width of the panoramic photo along the rotation direction of the mobile terminal when the panoramic photo is photographed are generally recorded and saved when the panoramic photo is photographed, which may be directly obtained from a relevant attribute of the panoramic photo that is saved when the panoramic photo is photographed in this embodiment of the present invention. It should be noted that in this embodiment of the present invention, a unit of the photo width of the panoramic photo is also pixel.

Optionally, in this embodiment of the present invention, the determining the minimum displacement of the panoramic photo may use the following manner. The minimum displacement of the panoramic photo is determined according to a formula $$s = d\frac{\varphi_1}{\varphi_2},$$

where s is the minimum displacement of the panoramic photo; d is the photo width of the panoramic photo; $\varphi_1$ is the preset rotation angle threshold; and $\varphi_2$ is the rotation angle of the mobile terminal when the panoramic photo is photographed.

In this embodiment of the present invention, for the browsed panoramic photo, when the panoramic photo is determined, the photo width d of the panoramic photo and the rotation angle $\varphi_2$ of the mobile terminal when the panoramic photo is photographed are fixed values (if the rotation angle $\varphi_2$ is recorded in a process of photographing the panoramic photo, the recorded value is used; and if the rotation angle $\varphi_2$ is not recorded during photographing, some reference values, such as 180 degrees or 360 degrees, may be used as the rotation angle); therefore, in this embodiment of the present invention, in order to implement smooth moving of the panoramic photo, an appropriate rotation angle threshold $\varphi_1$ may be preset. If the preset rotation angle threshold $\varphi_1$ is fixed, the minimum displacement for which the panoramic photo is moved in the rotation process is determined. In a process of browsing the panoramic photo, the rotation angle of the mobile terminal is detected and determined in real time, and if it is determined that the rotation angle of the mobile terminal reaches the preset rotation angle threshold $\varphi_1$, the panoramic photo is moved for the minimum displacement along a direction opposite to the rotation direction of the mobile terminal.

In this embodiment of the present invention, the rotation angle of the mobile terminal may be an angle difference between an angle corresponding to a current position of the mobile terminal and an angle corresponding to a position of the mobile terminal when the panoramic photo is moved for a previous time (if it is the first time to determine the rotation angle of the mobile terminal, it may be considered that a corresponding angle of the mobile terminal is 0 when the panoramic photo is moved for a previous time). In this embodiment of the present invention, a process of determining whether the rotation angle of the mobile terminal reaches the preset rotation angle threshold may be understood as a continuously executed and reset process, that is, each time the rotation angle of the mobile terminal reaches the preset rotation angle threshold $\varphi_1$, an initial rotation angle of the mobile terminal may be set to 0, the rotation angle is detected and determined, and the panoramic photo is moved according to whether the determined rotation angle reaches the preset rotation angle threshold. For example, the initial rotation angle of the mobile terminal is set to 0, and in a process in which the mobile terminal rotates from 0 degree to $\varphi_1-1$ degrees, the panoramic photo does not move; when the mobile terminal rotates to $\varphi_1$ degrees, the panoramic photo moves for the minimum displacement, the rotation angle is reset, and the rotation angle of the mobile terminal continues to be detected; and when the mobile terminal rotates to $\varphi_1$ degrees, the panoramic photo moves for the minimum displacement again, which is repeated until the mobile terminal stops rotating.

Further, in this embodiment of the present invention, a process of moving the panoramic photo may be an immediately executed process, that is, the panoramic photo is moved once it is determined that the rotation angle of the mobile terminal reaches the preset rotation angle threshold; for example, the preset rotation angle threshold $\varphi_1$ is 5 degrees, the panoramic photo is moved for the minimum displacement once the rotation angle reaches 5 degrees. The process of moving the panoramic photo may also be a process executed with delay, that is, the panoramic photo is moved for the minimum displacement within a period of time after it is determined that the rotation angle of the mobile terminal reaches the preset rotation angle threshold.

The rotation angle of the mobile terminal may further be a difference between the angle corresponding to the current position of the mobile terminal and the angle corresponding to the initial position of the mobile terminal, that is, the rotation angle of the mobile terminal may be a continuously accumulated value as a user moves the mobile terminal. In this case, a directly proportional relationship may be set between a displacement for which the panoramic photo moves and the rotation angle. That is, a larger rotation angle of the mobile terminal indicates a larger displacement for which the panoramic photo moves, and a smaller rotation angle of the mobile terminal indicates a smaller displacement for which the panoramic photo moves.

There may further be other embodiments for the foregoing manner of moving the panoramic photo and manner of determining manner of the minimum displacement, and specific implementation manners thereof are not limited in the present invention.

S205: Present the panoramic photo in the immersive browsing mode.

In implementation of panoramic photo browsing in an immersive browsing mode in this embodiment of the present invention, moving of the panoramic photo is implemented by rotating a mobile terminal instead of implementing moving of the panoramic photo by sliding the panoramic photo by using a finger. Another manner for presenting a panoramic photo may use an existing implementation solution, for example, when the panoramic photo is presented, an existing implementation manner may be used in a process of adapting the panoramic photo to a size of a display screen.

According to the method for controlling presentation of a panoramic photo provided in this embodiment of the present invention, when a trigger instruction that is used to instruct a mobile terminal to enter an immersive browsing mode is detected, a user is prompted to rotate the mobile terminal according to a set direction, and a placement direction in which the mobile terminal is located in a rotation process is determined, and a rotation angle of the mobile terminal in a corresponding direction is further determined according to the placement direction. A minimum displacement for which the panoramic photo moves is determined according to a preset rotation angle threshold, and the panoramic photo is moved for the minimum displacement along a direction opposite to a rotation direction of the mobile terminal and is presented. By using the present invention, a panoramic photo may be enabled to move as a mobile terminal rotates, so as to further implement browsing of the panoramic photo without requiring manual sliding on a screen of the mobile terminal to browse the panoramic photo, which is easy and convenient in terms of operations.

In this embodiment of the present invention, an implementation process of presenting a panoramic photo in a mobile terminal may use an implementation process of a program shown in FIG. 8, and the present invention is certainly not limited thereto.

Implementation of the method for controlling presentation of a panoramic photo in a mobile terminal provided this embodiment of the present invention is based on photo parameters that are saved when the panoramic photo is photographed, where the photo parameters are for example, an angle by which the mobile terminal rotates and a rotation direction of the mobile terminal when the panoramic photo is photographed, a photo width of the photographed panoramic photo. Therefore, in order to implement the method for presenting a panoramic photo in a mobile terminal provided in this embodiment of the present invention, the method may also differ from existing panoramic photo photographing during panoramic photo photographing. The following embodiments of the present invention describe a photographing process and a browsing process of a panoramic photo by using examples with reference to actual cases.

Figure 9A:
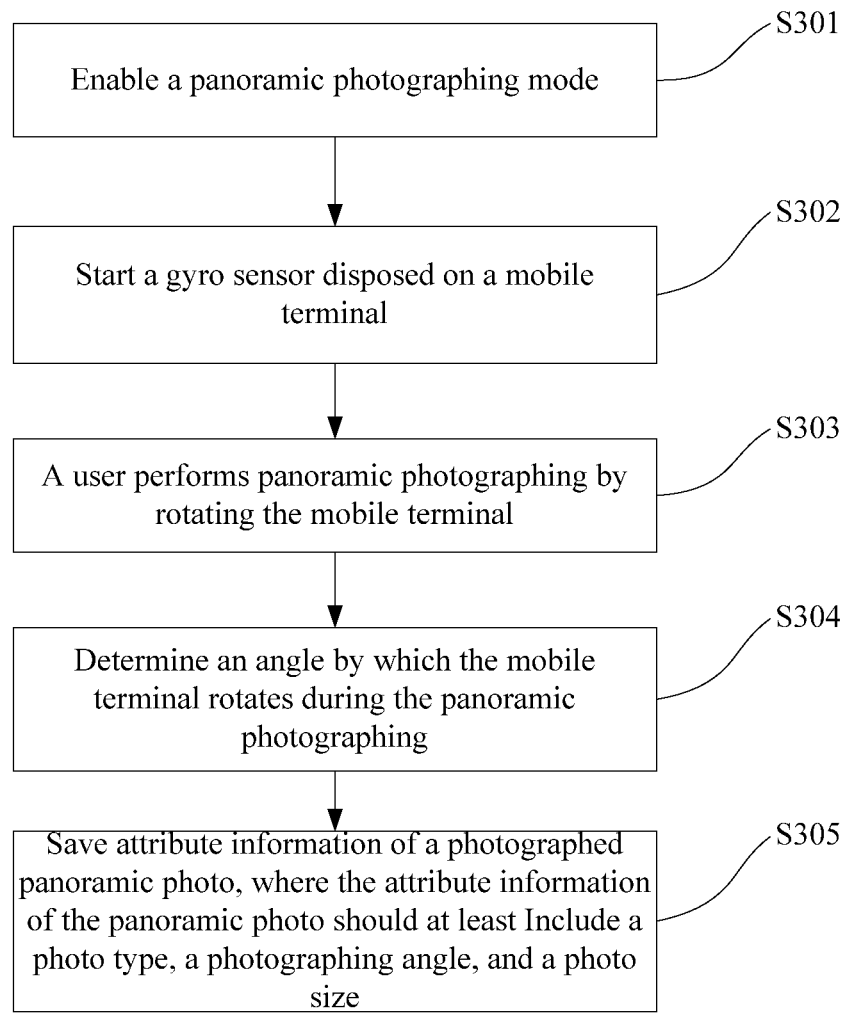
FIG. 9A is a schematic diagram of implementation of a process of photographing a panoramic photo according to an embodiment of the present invention.

FIG. 9A shows a schematic diagram of implementation of a process of photographing a panoramic photo according to an embodiment of the present invention. As shown in FIG. 9A, the implementation process includes the following steps:

S301: Enable a panoramic photographing mode.

S302: Start a gyro sensor disposed on a mobile terminal.

S303: A user performs panoramic photographing by rotating the mobile terminal.

S304: Determine an angle by which the mobile terminal rotates during the panoramic photographing.

In this embodiment of the present invention, a rotation angle of the mobile terminal may be determined by using an angle by which the gyro sensor started in S302 rotates.

S305: Save attribute information of the photographed panoramic photo.

In this embodiment of the present invention, the saved attribute information of the panoramic photo includes at least a photo type, a photographing angle, and a photo size, where the photo type indicates that the current photo is a panoramic photo, the photographing angle indicates the angle by which the mobile terminal rotates when the panoramic photo is photographed, and the photo size indicates a photo width of the panoramic photo.

Optionally, in this embodiment of the present invention, the saved attribute information of the panoramic photo may further include a rotation direction of the mobile terminal when the panoramic photo is photographed, where the rotation direction may be, for example, from right to left, and certainly, may also be from left to right.

Figure 9B:
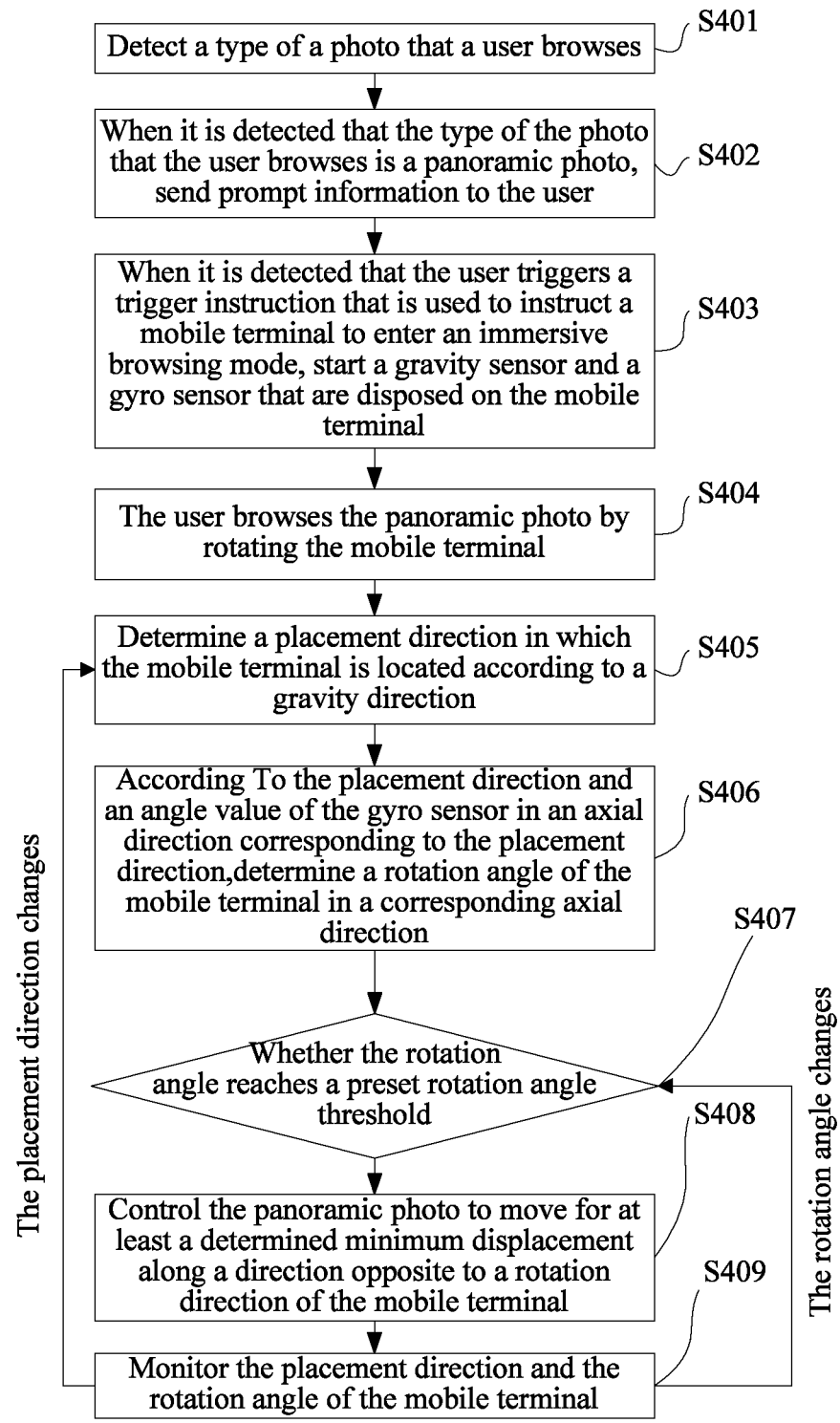
FIG. 9B is a schematic diagram of implementation of a process of browsing a panoramic photo according to an embodiment of the present invention.

FIG. 9B shows a schematic diagram of implementation of a process of browsing a panoramic photo according to an embodiment of the present invention. As shown in FIG. 9B, the implementation process includes the following steps:

S401: Detect a type of a photo that a user browses.

S402: When it is detected that the type of the photo that the user browses is a panoramic photo, send prompt information to the user, where the prompt information is used to prompt the user whether to choose to enter an immersive browsing mode. If the user chooses to enter the immersive browsing mode, perform S403; otherwise, browse the photo in a normal photo browsing mode.

S403: When it is detected that the user triggers a trigger instruction that is used to instruct a mobile terminal to enter the immersive browsing mode, a gravity sensor and a gyro sensor that are disposed on the mobile terminal are started.

S404: The user browses the panoramic photo by rotating the mobile terminal.

S405: Determine a placement direction in which the mobile terminal is located according to a gravity direction indicated by the gravity sensor, where the determined placement direction may be a horizontal placement direction, or may be a vertical placement direction. For a specific process of the determining, reference may be made to relevant description of the foregoing embodiments.

S406: Determine a rotation angle of the mobile terminal in a corresponding axial direction according to the placement direction determined in S405 and an angle value of the gyro sensor in an axial direction corresponding to the placement direction, that is, when the placement direction of the mobile terminal is the horizontal placement direction, determine an angle by which the mobile terminal rotates in a direction of a Z-axis, and when the placement direction of the mobile terminal is the vertical placement direction, determine an angle by which the mobile terminal rotates in a direction of an X-axis or a Y-axis.

S407: Determine whether the rotation angle determined in S406 reaches a preset rotation angle threshold; and if yes, perform S408; otherwise, perform S409.

S408: Control the panoramic photo to move for at least a determined minimum displacement along a direction opposite to a rotation direction of the mobile terminal.

S409: Detect the placement direction and the rotation angle of the mobile terminal; when the placement direction of the mobile terminal changes, perform S405, and when the rotation angle changes, perform S407.

In this embodiment of the present invention, when a panoramic photo is browsed, variations of a placement direction and a rotation angle of the mobile terminal are detected in real time, so as to adjust moving of the panoramic photo in a timely manner.

According to the method for presenting a panoramic photo in a mobile terminal provided in this embodiment of the present invention, in an immersive browsing mode, the panoramic photo moves as the mobile terminal rotates. By using the present invention, when browsing a panoramic photo, a user may choose to enter the immersive browsing mode, where in the immersive browsing mode, the panoramic photo may be browsed by rotating the mobile terminal, and it is not required to manually slide on a mobile terminal screen to browse the panoramic photo.

Figure 10A:
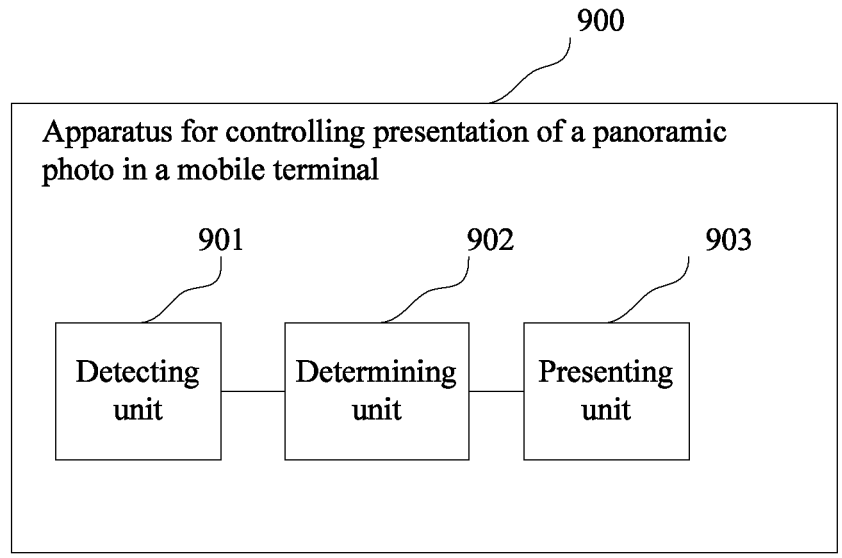
FIG. 10A to FIG. 10D are schematic structural diagrams of an apparatus for presenting a panoramic photo in a mobile terminal according to an embodiment of the present invention.

Based on the method for presenting a panoramic photo in a mobile terminal provided in the foregoing embodiment, an embodiment of the present invention further provides an apparatus 900 for presenting a panoramic photo in a mobile terminal. As shown in FIG. 10A, the apparatus 900 includes a detecting unit 901, a determining unit 902, and a presenting unit 903.

The detecting unit 901 is configured to detect a trigger instruction that is used to instruct the mobile terminal to enter an immersive browsing mode; and when the trigger instruction that is used to instruct the mobile terminal to enter the immersive browsing mode is detected, transmit a detection result to the determining unit 902, where the immersive browsing mode is a browsing mode in which a panoramic photo moves as the mobile terminal rotates.

The determining unit 902 is configured to receive the detection result transmitted by the detecting unit 901; and if the detection result is that the trigger instruction is detected, detect and determine a rotation angle of the mobile terminal, and transmit the determined rotation angle of the mobile terminal to the presenting unit 903.

The presenting unit 903 is configured to receive the rotation angle of the mobile terminal determined by the determining unit 902; and move and present, according to the determined rotation angle, a panoramic photo that is presented in a normal mode in the mobile terminal.

In a first implementation manner, the determining unit 902 is specifically configured to determine the rotation angle of the mobile terminal in the following manner, determining a placement direction in which the mobile terminal is located in a rotation process, and determining the rotation angle of the mobile terminal according to the placement direction.

In a second implementation manner, the determining unit 902 is specifically configured to determine, in the following manner, the placement direction in which the mobile terminal is located in the rotation process: detecting an angle of a gravity direction of the mobile terminal with respective to a direction of an X-Y plane of a reference three-dimensional coordinate system, where the X-Y plane of the reference three-dimensional coordinate system is parallel to a plane in which a screen of the mobile terminal is located, and a Z-axis of the reference three-dimensional coordinate system is perpendicular to the plane in which the screen of the mobile terminal is located; and determining, according to the angle of the gravity direction of the mobile terminal with respective to the direction of the X-Y plane of the reference three-dimensional coordinate system, the placement direction in which the mobile terminal is located in the rotation process.

In a third implementation manner, the determining unit 902 is specifically configured to determine, in the following manner, according to the angle of the gravity direction of the mobile terminal with respective to the direction of the X-Y plane of the reference three-dimensional coordinate system, the placement direction in which the mobile terminal is located in the rotation process: when the angle of the gravity direction of the mobile terminal with respective to the direction of the X-Y plane of the reference three-dimensional coordinate system is not greater than 45 degrees, determining that the placement direction in which the mobile terminal is located in the rotation process is a vertical placement direction; and when the angle of the gravity direction of the mobile terminal with respective to the direction of the X-Y plane of the reference three-dimensional coordinate system is greater than 45 degrees, determining that the placement direction in which the mobile terminal is located in the rotation process is a horizontal placement direction.

In a fourth implementation manner, the determining unit 902 is specifically configured to determine, in the following manner, the rotation angle of the mobile terminal according to the placement direction: if it is determined that the placement direction in which the mobile terminal is located in the rotation process is the horizontal placement direction, using a direction of the Z-axis in the reference three-dimensional coordinate system as a corresponding axial direction of the mobile terminal in the rotation process, and using an angle by which the mobile terminal rotates with respective to the axial direction as the rotation angle of the mobile terminal, or if it is determined that the placement direction in which the mobile terminal is located in the rotation process is the vertical placement direction, using a direction of an X-axis or a direction of a Y-axis in the reference three-dimensional coordinate system as a corresponding axial direction of the mobile terminal in the rotation process, and using an angle by which the mobile terminal rotates with respective to the axial direction as the rotation angle of the mobile terminal.

Figure 10B:
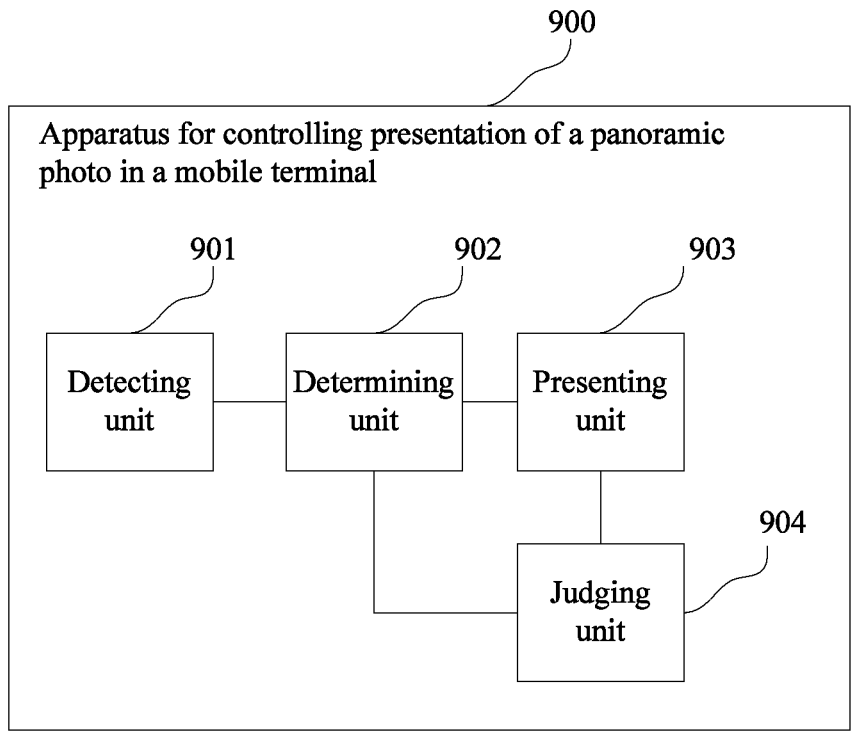

In a fifth implementation manner, the apparatus further includes a judging unit 904, as shown in FIG. 10B, where before the presenting unit 903 moves, according to the determined rotation angle, the panoramic photo that is presented in the normal mode in the mobile terminal, the judging unit 904 determines that the rotation angle of the mobile terminal reaches a preset rotation angle threshold.

In a sixth implementation manner, the determining unit 902 is further configured to before the presenting unit 903 moves, according to the determined rotation angle, the panoramic photo that is presented in the normal mode in the mobile terminal, determine a minimum displacement of the panoramic photo according to the preset rotation angle threshold, a rotation angle of the mobile terminal when the panoramic photo is photographed, and a photo width of the panoramic photo along a rotation direction of the mobile terminal when the panoramic photo is photographed, and the presenting unit 903 is specifically configured to move, in the following manner, the panoramic photo that is presented in the normal mode in the mobile terminal moving the panoramic photo for the foregoing determined minimum displacement along a direction opposite to the rotation direction of the mobile terminal.

Figure 10C:
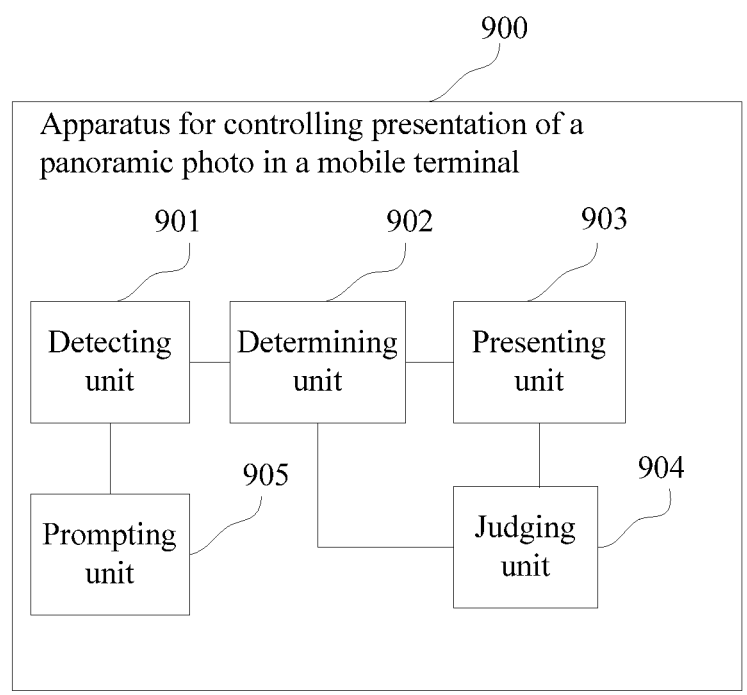

In a seventh implementation manner, the apparatus further includes a prompting unit 905. As shown in FIG. 10C, where the prompting unit 905 is configured to receive the detection result transmitted by the detecting unit 901; and when the detection result is that the trigger instruction that is used to instruct the mobile terminal to enter the immersive browsing mode is detected by the detecting unit 901, provide prompt information that is used to instruct to rotate the mobile terminal.

Figure 10D:
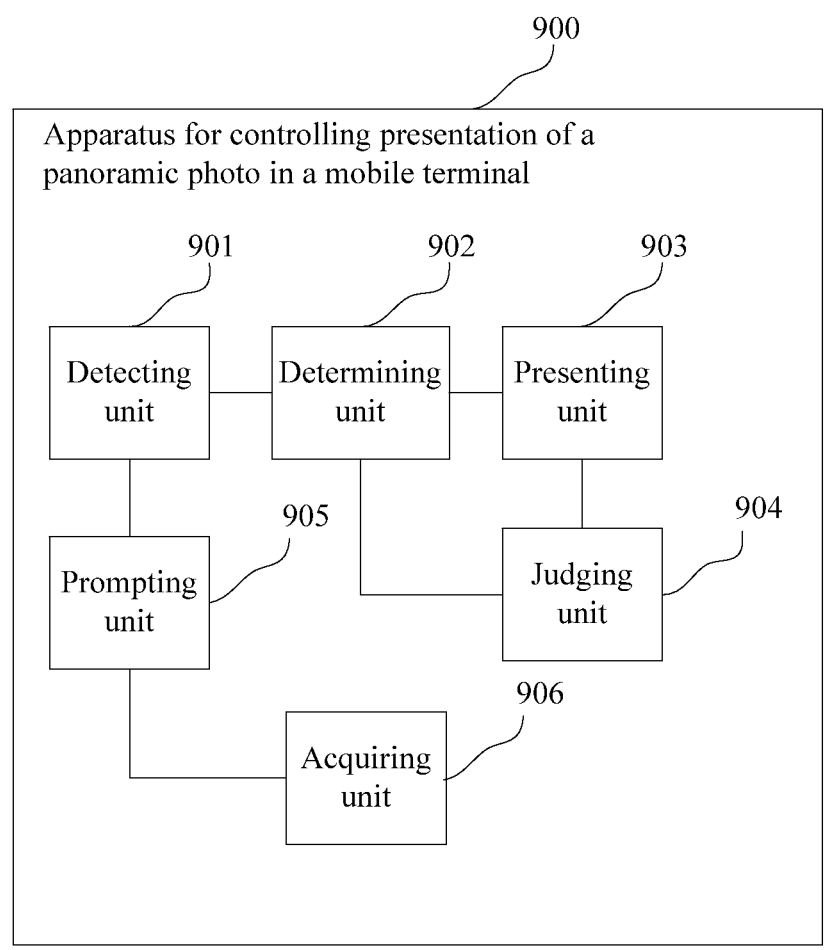

In a eighth implementation manner, the apparatus further includes an acquiring unit 906, as shown in FIG. 10D, where the acquiring unit 906 is configured to acquire a rotation direction of the mobile terminal that is saved when the panoramic photo is photographed, and transmit, to the prompting unit 905, the acquired rotation direction of the mobile terminal that is saved when the photo is photographed, and the prompting unit 905 is specifically configured to provide, in the following manner, the prompt information that is used to instruct to rotate the mobile terminal: providing the prompt information that is used to instruct to rotate the mobile terminal according to the rotation direction acquired by the acquiring unit 906.

It should be noted that, for the apparatus for presenting a panoramic photo in a mobile terminal provided in FIG. 10A to FIG. 10D in this embodiment of the present invention, if a process of specifically implementing presentation of a panoramic photo in a mobile terminal is not described with sufficient details, reference may be made to relevant description of the method embodiments, and details are not described herein again.

According to the apparatus for presenting a panoramic photo in a mobile terminal provided in this embodiment of the present invention, in an immersive browsing mode, the panoramic photo moves as the mobile terminal rotates. By using the present invention, when browsing a panoramic photo, a user may choose to enter the immersive browsing mode, where in the immersive browsing mode, the panoramic photo may be browsed by rotating the mobile terminal, and it is not required to manually slide on a mobile terminal screen to browse the panoramic photo.

Figure 11:
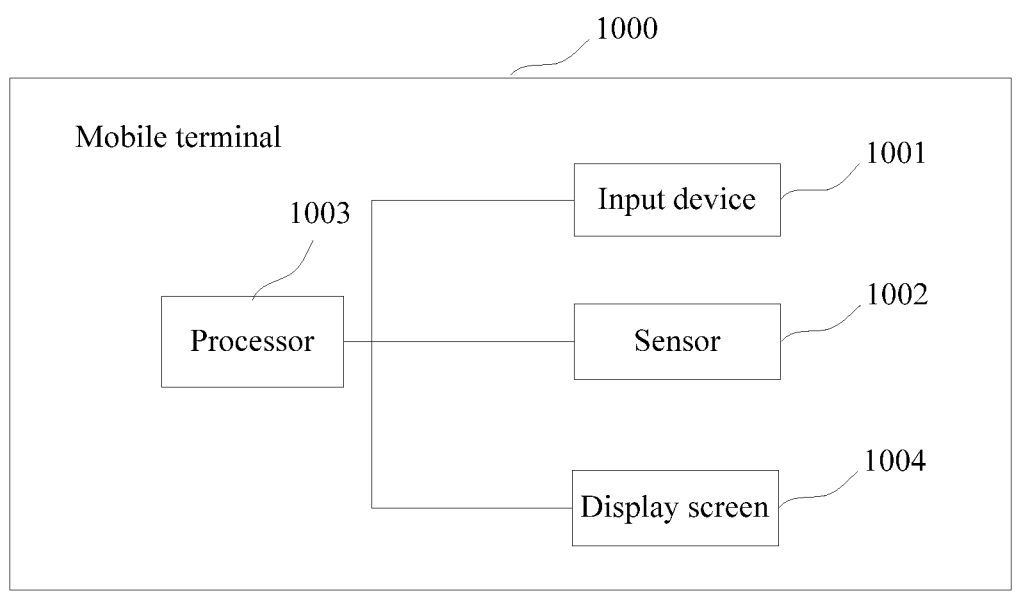
FIG. 11 is a schematic structural diagram of a mobile terminal according to an embodiment of the present invention.

Based on the method and the apparatus for presenting a panoramic photo in a mobile terminal that are provided in the foregoing embodiments, an embodiment of the present invention further provides a mobile terminal 1000. As shown in FIG. 11, the mobile terminal 1000 includes an input device 1001, a sensor 1002, a processor 1003, and a display screen 1004, where the input device 1001 is configured to input a trigger instruction that is used to instruct the mobile terminal to enter an immersive browsing mode, where the immersive browsing mode is a browsing mode in which a panoramic photo moves as the mobile terminal rotates, the sensor 1002 is configured to detect a rotation angle of the mobile terminal, the processor 1003 is configured to, when it is detected that the trigger instruction is input by the input device 1001, move, according to the rotation angle determined by means of detection, a panoramic photo that is presented in a normal mode in the mobile terminal, and the display screen 1004 is configured to present the panoramic photo.

In this embodiment of the present invention, there may be one or multiple input devices 1001, for example, the input device 1001 may be a display screen or a button, and may be integrated with the processor 1003, or may be an independent peripheral device (for example, a scanner, a camera, or a loudspeaker). If the input device 1001 is a peripheral device, the input device 1001 may be connected to the processor 1003 by using a wired connection (for example, a cable/port) or a wireless connection (for example, Bluetooth).

The processor 1003 may be implemented on a single chip, multiple chips or multiple electronic components, and may use multiple types of architectures, including an embedded processor, a dedicated processor, a controller, and the like.

There may be one or multiple sensors 1002, where the sensor 1002 may have or may not have an operation processing function. For example, the sensor 1002 in this embodiment of the present invention may be at least one of a gravity sensor and a gyro sensor.

In this embodiment of the present invention, if the sensor 1002 has the operation processing function, the sensor 1002 may determine the rotation angle of the mobile terminal; and if the sensor 1002 does not have the operation processing function, the sensor 1002 may detect the rotation angle of the mobile terminal, and transmit the rotation angle of the mobile terminal obtained by means of detection to the processor 1003. The processor 1003 determines the rotation angle of the mobile terminal.

In a first implementation manner, the sensor 1002 may be configured to determine a placement direction in which the mobile terminal is located in a rotation process, and determine the rotation angle of the mobile terminal according to the determined placement direction.

In a second implementation manner, the sensor 1002 is specifically configured to determine, in the following manner, the placement direction in which the mobile terminal is located in the rotation process: detecting an angle of a gravity direction of the mobile terminal with respective to a direction of an X-Y plane of a reference three-dimensional coordinate system, where the X-Y plane of the reference three-dimensional coordinate system is parallel to a plane in which a screen of the mobile terminal is located, and a Z-axis of the reference three-dimensional coordinate system is perpendicular to the plane in which the screen of the mobile terminal is located; and determining, according to the angle of the gravity direction of the mobile terminal with respective to the direction of the X-Y plane of the reference three-dimensional coordinate system, the placement direction in which the mobile terminal is located in the rotation process.

In a third implementation manner, the sensor 1002 is specifically configured to determine, in the following manner, according to the angle of the gravity direction of the mobile terminal with respective to the direction of the X-Y plane of the reference three-dimensional coordinate system, the placement direction in which the mobile terminal is located in the rotation process: when the angle of the gravity direction of the mobile terminal with respective to the direction of the X-Y plane of the reference three-dimensional coordinate system is not greater than 45 degrees, determining that the placement direction in which the mobile terminal is located in the rotation process is a vertical placement direction, and when the angle of the gravity direction of the mobile terminal with respective to the direction of the X-Y plane of the reference three-dimensional coordinate system is greater than 45 degrees, determining that the placement direction in which the mobile terminal is located in the rotation process is a horizontal placement direction.

In a fourth implementation manner, the sensor 1002 is specifically configured to determine, in the following manner, the rotation angle of the mobile terminal according to the placement direction: if it is determined that the placement direction in which the mobile terminal is located in the rotation process is the horizontal placement direction, using a direction of the Z-axis in the reference three-dimensional coordinate system as a corresponding axial direction of the mobile terminal in the rotation process, and using an angle by which the mobile terminal rotates with respect to the axial direction as the rotation angle of the mobile terminal, or if it is determined that the placement direction in which the mobile terminal is located in the rotation process is the vertical placement direction, using a direction of an X-axis or a direction of a Y-axis in the reference three-dimensional coordinate system as a corresponding axial direction of the mobile terminal in the rotation process, and using an angle by which the mobile terminal rotates with respect to the axial direction as the rotation angle of the mobile terminal.

In a fifth implementation manner, the processor 1003 is further configured to before moving, according to the determined rotation angle, the panoramic photo that is presented in the normal mode in the mobile terminal, determine that the rotation angle of the mobile terminal reaches a preset rotation angle threshold.

In a sixth implementation manner, the processor 1003 is further configured to before moving, according to the determined rotation angle, the panoramic photo that is presented in the normal mode in the mobile terminal, determine a minimum displacement of the panoramic photo according to the preset rotation angle threshold, a rotation angle of the mobile terminal when the panoramic photo is photographed, and a photo width of the panoramic photo along a rotation direction of the mobile terminal when the panoramic photo is photographed, and the processor 1003 is specifically configured to move, in the following manner, the panoramic photo that is presented in the normal mode in the mobile terminal: moving the panoramic photo for the minimum displacement along a direction opposite to the rotation direction of the mobile terminal.

In a seventh implementation manner, the processor 1003 is further configured to when it is detected that the trigger instruction is input by the input device 1001, provide prompt information that is used to instruct to rotate the mobile terminal.

In an eighth implementation manner, the processor 1003 is further configured to before providing the prompt information that is used to instruct to rotate the mobile terminal, acquire a rotation direction of the mobile terminal that is saved when the panoramic photo is photographed, and the processor 1003 is specifically configured to provide, in the following manner, the prompt information that is used to instruct to rotate the mobile terminal: providing the prompt information that is used to instruct to rotate the mobile terminal according to the acquired rotation direction.

It should be noted that, for the mobile terminal provided in FIG. 11 in this embodiment of the present invention, if a process of specifically implementing controlling the panoramic photo to display in the mobile terminal is not described with sufficient details, reference may be made to relevant description of the method embodiments, and details are not described herein again.

According to the mobile terminal provided in this embodiment of the present invention, when a user chooses to browse a panoramic photo in an immersive browsing mode, the panoramic photo moves as the mobile terminal rotates. By using the present invention, when browsing a panoramic photo, a user may choose to enter an immersive browsing mode, where in the immersive browsing mode, the panoramic photo may be browsed by rotating the mobile terminal, and it is not required to manually slide on a mobile terminal screen to browse the panoramic photo.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a compact disc read-only memory (CD-ROM), an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the scope of the embodiments of the present invention. The present invention is intended to cover these modifications and variations provided that they fall within the scope of protection defined by the following claims and their equivalent technologies.

What is claimed is:

1. A method for presenting a panoramic photo in a mobile terminal, comprising:
    detecting a trigger instruction that is used to instruct the mobile terminal to enter an immersive browsing mode, wherein the immersive browsing mode is a browsing mode in which the panoramic photo moves as the mobile terminal rotates;
    detecting and determining a rotation angle of the mobile terminal when the trigger instruction is detected;
    calculating a minimum displacement of the panoramic photo according to a preset rotation angle threshold, a rotation angle of the mobile terminal when the panoramic photo is photographed, and a photo width of the panoramic photo along a rotation direction of the mobile terminal when the panoramic photo is photographed; and
    moving and presenting, according to the rotation angle and the minimum displacement, the panoramic photo that is displayed in a normal mode in the mobile terminal, and
    wherein the panoramic photo is moved for the minimum displacement along a direction opposite to a rotation direction of the mobile terminal.

2. The method according to claim 1, wherein determining the rotation angle of the mobile terminal comprises:
    determining a placement direction in which the mobile terminal is located in a rotation process; and
    determining the rotation angle of the mobile terminal according to the placement direction.

3. The method according to claim 2, wherein determining the placement direction in which the mobile terminal is located in the rotation process comprises:
    detecting an angle of a gravity direction of the mobile terminal with respective to a direction of an X-Y plane of a reference three-dimensional coordinate system, wherein the X-Y plane of the reference three-dimensional coordinate system is parallel to a plane in which a screen of the mobile terminal is located, and wherein a Z-axis of the reference three-dimensional coordinate system is perpendicular to the plane in which the screen of the mobile terminal is located; and
    determining, according to the angle of the gravity direction of the mobile terminal with respective to the direction of the X-Y plane of the reference three-dimensional coordinate system, the placement direction in which the mobile terminal is located in the rotation process.

4. The method according to claim 3, wherein determining, according to the angle of the gravity direction of the mobile terminal with respective to the direction of the X-Y plane of the reference three-dimensional coordinate system, the placement direction in which the mobile terminal is located in the rotation process comprises:
    determining that the placement direction in which the mobile terminal is located in the rotation process is a vertical placement direction when the angle of the gravity direction of the mobile terminal with respective to the direction of the X-Y plane of the reference three-dimensional coordinate system is not greater than 45 degrees; and
    determining that the placement direction in which the mobile terminal is located in the rotation process is a horizontal placement direction when the angle of the gravity direction of the mobile terminal with respective to the direction of the X-Y plane of the reference three-dimensional coordinate system is greater than 45 degrees.

5. The method according to claim 3, wherein determining the rotation angle of the mobile terminal according to the placement direction comprises:
    using a direction of the Z-axis in the reference three-dimensional coordinate system as a corresponding axial direction of the mobile terminal in the rotation process when it is determined that the placement direction in which the mobile terminal is located in the rotation process is a horizontal placement direction; and
    using an angle by which the mobile terminal rotates with respective to the axial direction as the rotation angle of the mobile terminal.

6. The method according to claim 3, wherein determining the rotation angle of the mobile terminal according to the placement direction comprises:
    using one of a direction of an X-axis and a direction of a Y-axis in the reference three-dimensional coordinate system as a corresponding axial direction of the mobile terminal in the rotation process when it is determined that the placement direction in which the mobile terminal is located in the rotation process is a vertical placement direction; and
    using an angle by which the mobile terminal rotates with respective to the axial direction as the rotation angle of the mobile terminal.

7. The method according to claim 1, wherein before moving, according to the rotation angle, the panoramic photo that is displayed in the normal mode in the mobile terminal, further comprises determining that the rotation angle of the mobile terminal reaches the preset rotation angle threshold.

8. The method according to claim 1, wherein before detecting and determining the rotation angle of the mobile terminal, the method further comprises providing prompt information that is used to instruct to rotate the mobile terminal.

9. The method according to claim 8, wherein before providing the prompt information that is used to instruct to rotate the mobile terminal, the method further comprises acquiring a rotation direction of the mobile terminal that is saved when the panoramic photo is photographed, and wherein providing the prompt information that is used to instruct to rotate the mobile terminal comprises providing the prompt information that is used to instruct to rotate the mobile terminal according to the acquired rotation direction.

10. The method according to claim 1, wherein the minimum displacement is calculated according to an equation:

$$s = d\frac{\varphi_1}{\varphi_2},$$

wherein s is the minimum displacement, d is the width of the panoramic photo, $\phi_1$ is the preset rotation angle threshold, and wherein $\phi_2$ is the rotation angle of the mobile terminal when the panoramic photo is photographed.

11. A mobile terminal, comprising:
an input device;
a sensor;
a processor coupled to the input device and the sensor; and
a display screen coupled to the processor,
wherein the input device is configured to input a trigger instruction that is used to instruct the mobile terminal to enter an immersive browsing mode,
wherein the immersive browsing mode is a browsing mode in which a panoramic photo moves as the mobile terminal rotates,
wherein the sensor is configured to detect a rotation angle of the mobile terminal,
wherein the processor is configured to determine a minimum displacement of the panoramic photo according to a preset rotation angle threshold, a rotation angle of the mobile terminal when the panoramic photo is photographed, and a photo width of the panoramic photo along a rotation direction of the mobile terminal when the panoramic photo is photographed,
wherein the processor is configured to, when it is detected that the trigger instruction is input by the input device, move, according to the rotation angle and the minimum displacement, the panoramic photo that is presented in a normal mode in the mobile terminal,
wherein the processor is configured to move the panoramic photo for the minimum displacement along a direction opposite to the rotation direction of the mobile terminal, and
wherein the display screen is configured to present the panoramic photo.

12. The mobile terminal according to claim 11, wherein the sensor is configured to:
determine a placement direction in which the mobile terminal is located in a rotation process; and
determine the rotation angle of the mobile terminal according to the placement direction.

13. The mobile terminal according to claim 12, wherein the sensor is configured to determine, in the following manner, the placement direction in which the mobile terminal is located in the rotation process:
detecting an angle of a gravity direction of the mobile terminal with respective to a direction of an X-Y plane of a reference three-dimensional coordinate system, wherein the X-Y plane of the reference three-dimensional coordinate system is parallel to a plane in which a screen of the mobile terminal is located, and wherein a Z-axis of the reference three-dimensional coordinate system is perpendicular to the plane in which the screen of the mobile terminal is located; and
determining, according to the angle of the gravity direction of the mobile terminal with respective to the direction of the X-Y plane of the reference three-dimensional coordinate system, the placement direction in which the mobile terminal is located in the rotation process.

14. The mobile terminal according to claim 12, wherein the sensor is configured to determine, in the following manner, according to the angle of the gravity direction of the mobile terminal with respective to the direction of the X-Y plane of the reference three-dimensional coordinate system, and wherein the placement direction in which the mobile terminal is located in the rotation process:
determining that the placement direction in which the mobile terminal is located in the rotation process is a vertical placement direction when the angle of the gravity direction of the mobile terminal with respective to the direction of the X-Y plane of the reference three-dimensional coordinate system is not greater than 45 degrees; and
determining that the placement direction in which the mobile terminal is located in the rotation process is a horizontal placement direction when the angle of the gravity direction of the mobile terminal with respective to the direction of the X-Y plane of the reference three-dimensional coordinate system is greater than 45 degrees.

15. The mobile terminal according to claim 13, wherein the sensor is configured to determine, in the following manner, the rotation angle of the mobile terminal according to the placement direction:
using a direction of the Z-axis in the reference three-dimensional coordinate system as a corresponding axial direction of the mobile terminal in the rotation process when it is determined that the placement direction in which the mobile terminal is located in the rotation process is a horizontal placement direction; and
using an angle by which the mobile terminal rotates with respective to the axial direction as the rotation angle of the mobile terminal.

16. The mobile terminal according to claim 13, wherein the sensor is configured to determine, in the following manner, the rotation angle of the mobile terminal according to the placement direction:
using one of a direction of an X-axis and a direction of a Y-axis in the reference three-dimensional coordinate system as a corresponding axial direction of the mobile terminal in the rotation process when it is determined that the placement direction in which the mobile terminal is located in the rotation process is a vertical placement direction; and
using an angle by which the mobile terminal rotates with respective to the axial direction as the rotation angle of the mobile terminal.

17. The mobile terminal according to claim 11, wherein the processor is further configured to determine that the rotation angle of the mobile terminal reaches the preset rotation angle threshold before moving, according to the rotation angle, the panoramic photo that is presented in the normal mode in the mobile terminal.

18. The mobile terminal according to claim 11, wherein the processor is further configured to provide prompt information that is used to instruct to rotate the mobile terminal when it is detected that the trigger instruction is input by the input device.

19. The mobile terminal according to claim 18, wherein the processor is further configured to acquire a rotation direction of the mobile terminal that is saved when the panoramic photo is photographed before providing the prompt information that is used to instruct to rotate the mobile terminal, and wherein the processor is specifically configured to provide, in the following manner, the prompt information that is used to instruct to rotate the mobile terminal by providing the prompt information that is used to instruct to rotate the mobile terminal according to the acquired rotation direction.

20. The mobile terminal according to claim 11, wherein the minimum displacement is calculated according to an equation:

$$s = d\frac{\varphi_1}{\varphi_2},$$

wherein s is the minimum displacement, d is the width of the panoramic photo, $\phi_1$ is the preset rotation angle threshold, and wherein $\phi_2$ is the rotation angle of the mobile terminal when the panoramic photo is photographed.

\* \* \* \* \*